Feb. 28, 1956  W. J. CALDWELL  2,736,345
METHOD OF AND MACHINE FOR WINDING COILS CONTINUOUSLY
Filed Aug. 29, 1952  5 Sheets-Sheet 1
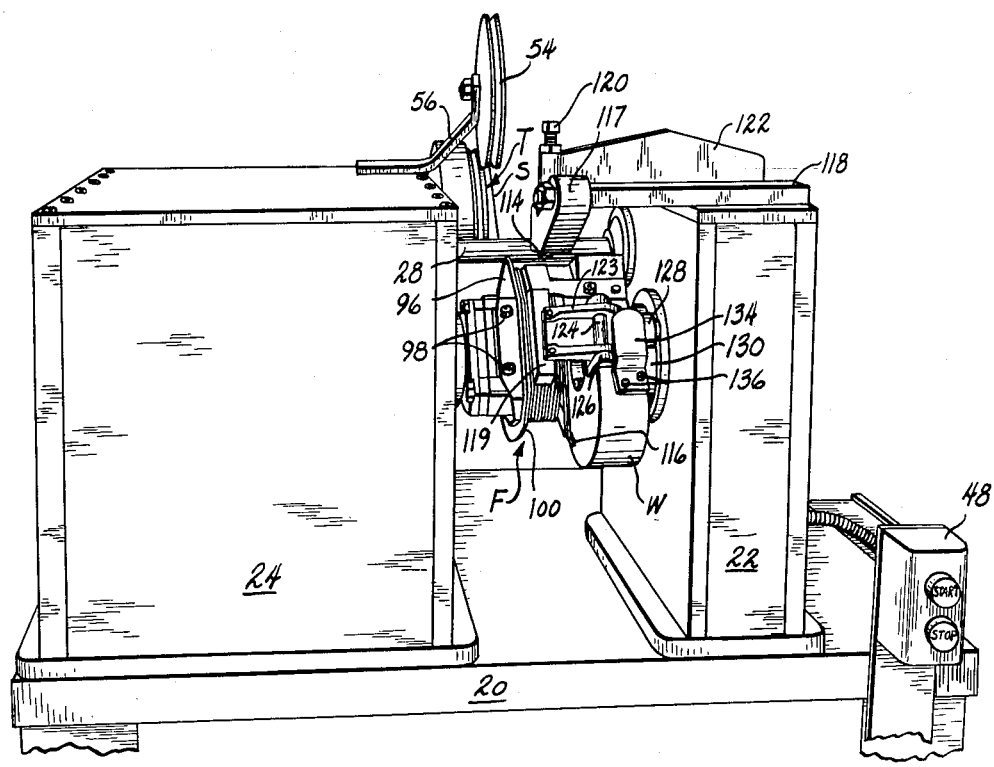
Fig. I
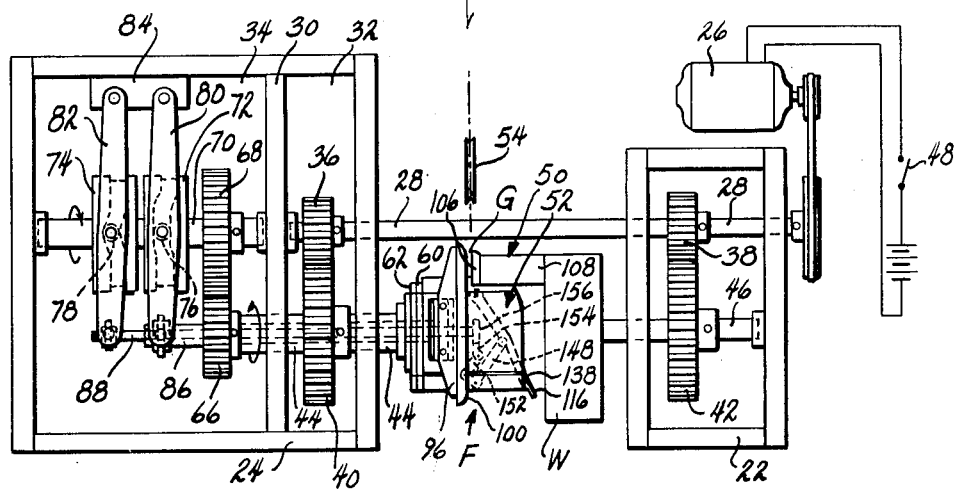
Fig. II
INVENTOR.
Washington J. Caldwell
BY
Falvey, Souther & Stoltenberg Feb. 28, 1956 W. J. CALDWELL 2,736,345
METHOD OF AND MACHINE FOR WINDING COILS CONTINUOUSLY
Filed Aug. 29, 1952 5 Sheets-Sheet 2
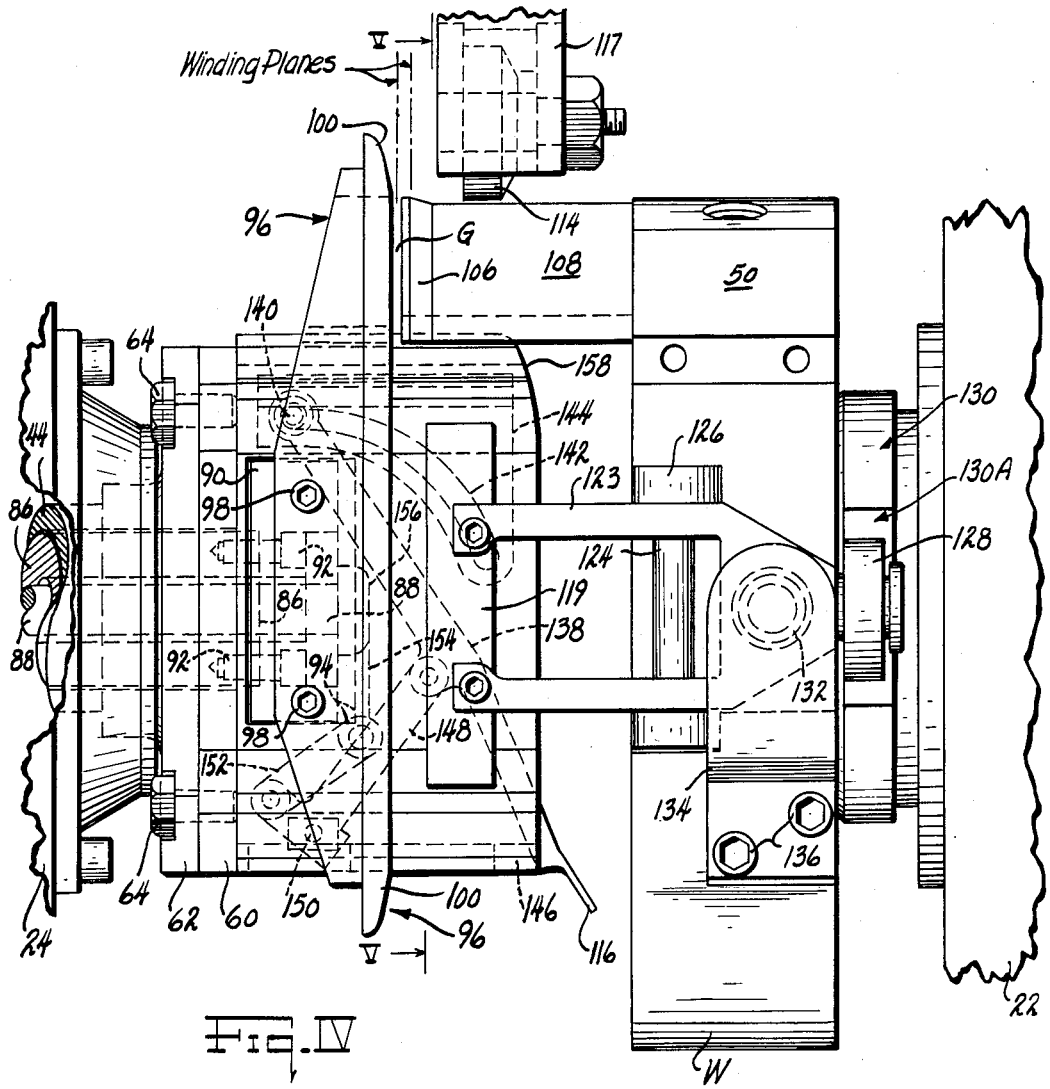
Fig. IV
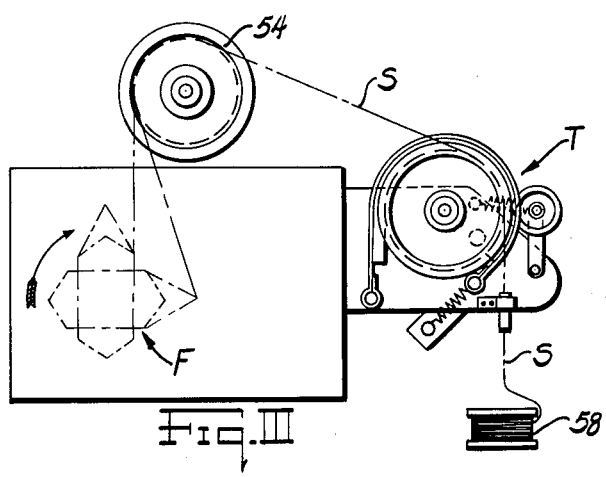
Fig. III
INVENTOR.
*Washington J. Caldwell*
BY
*Falvey, Souther & Stoltenberg*

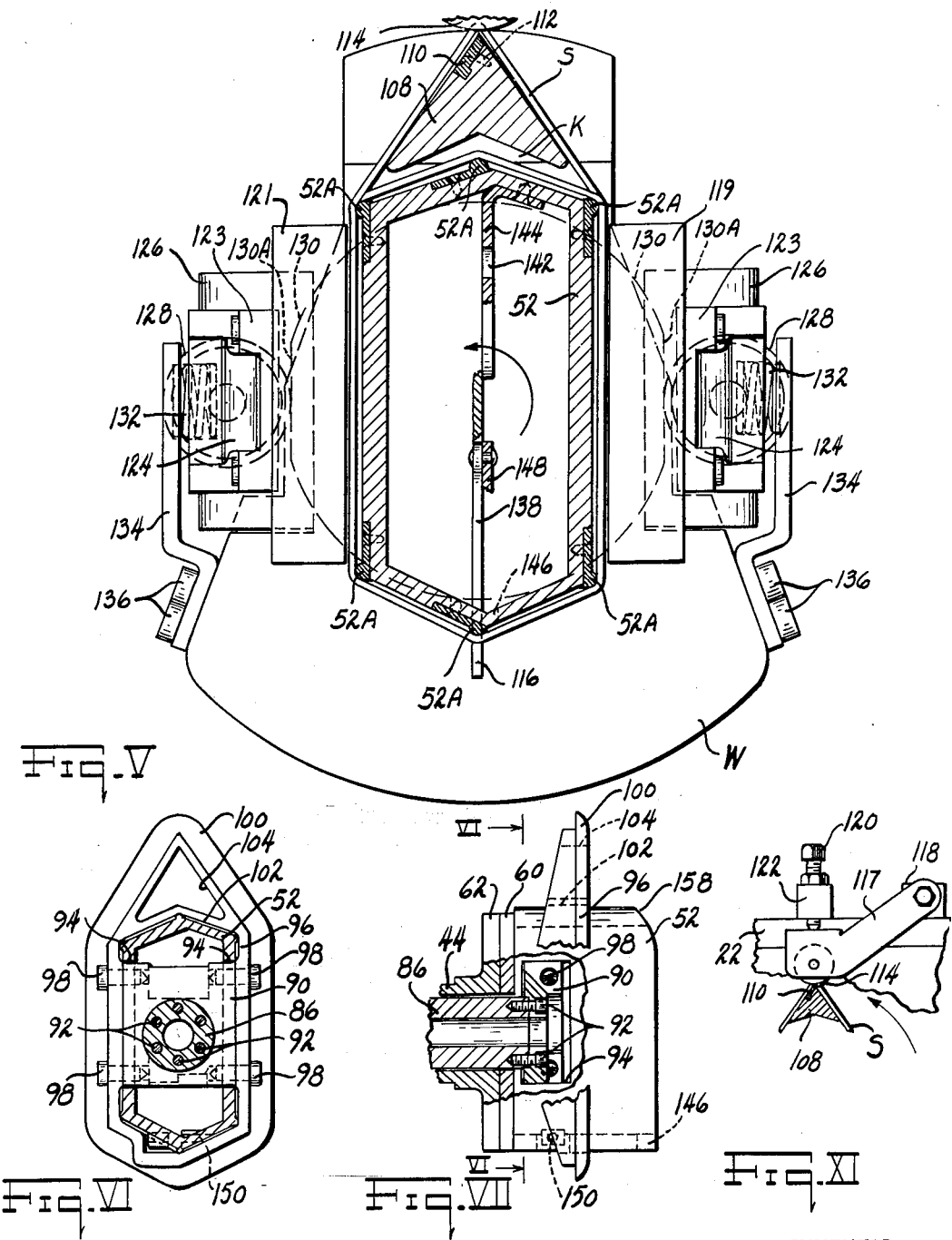

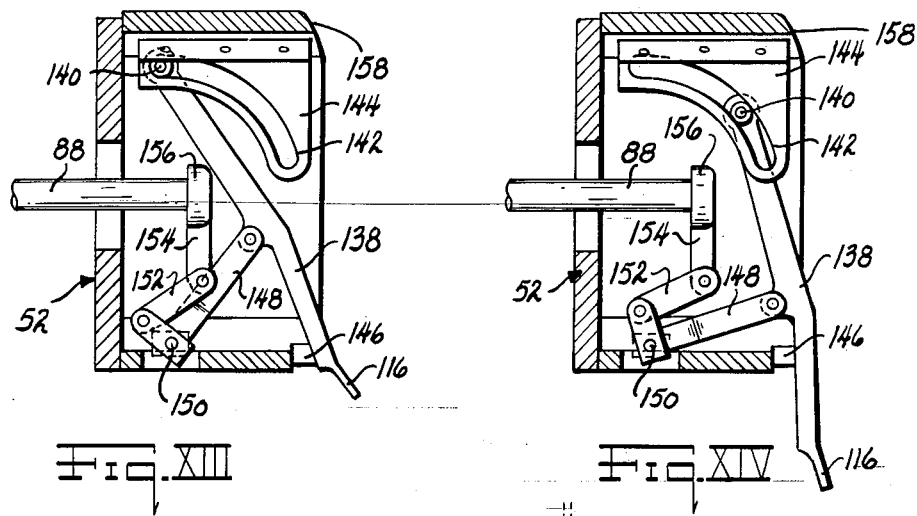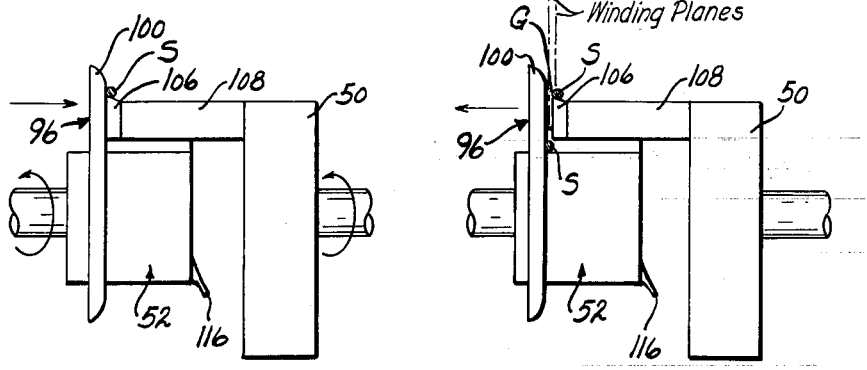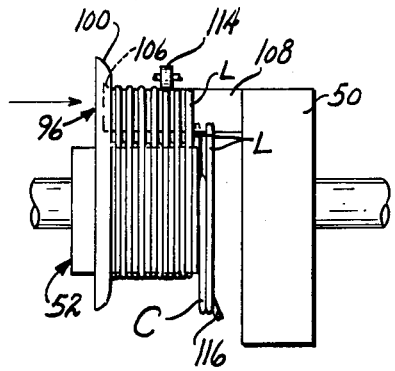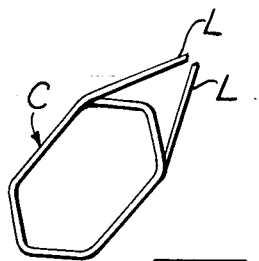
INVENTOR.
Washington J. Caldwell

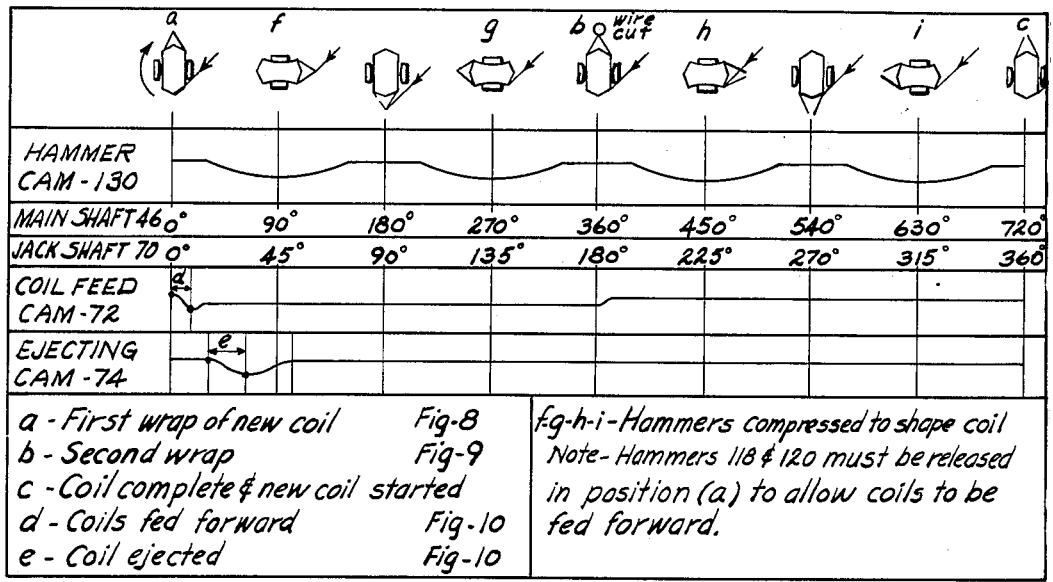
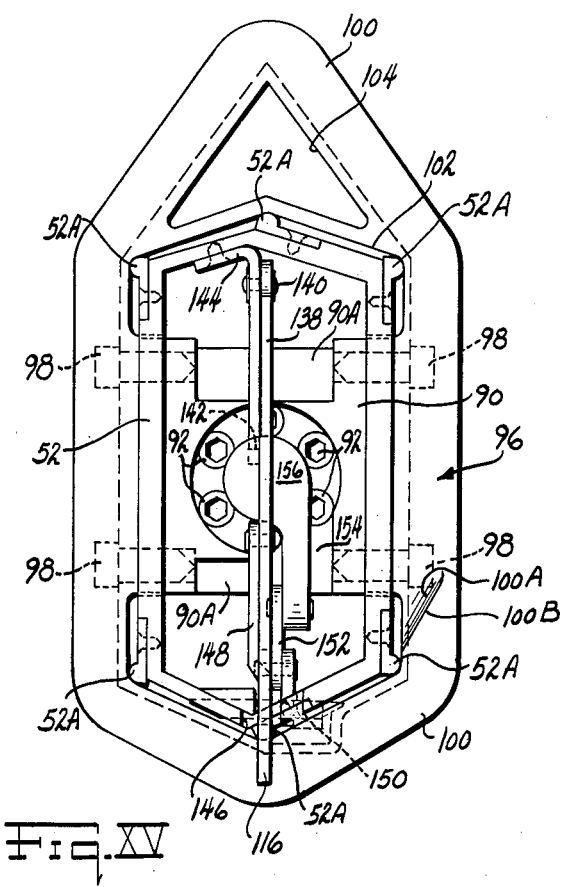

United States Patent Office 2,736,345
Patented Feb. 28, 1956

2,736,345

METHOD OF AND MACHINE FOR WINDING COILS CONTINUOUSLY

Washington J. Caldwell, Toledo, Ohio

Application August 29, 1952, Serial No. 307,106

7 Claims. (Cl. 140—92.2)

The invention relates to a method of and a machine for winding coils from strands of wire continuously and at high speed for use in connection with mass production of electrical devices.

In the prior art, machines for winding electrical coils have been built and used in connection with the mass production of electrical devices such as motors and generators and the like, but, in each case, the coils were wound intermittently with the coil winding machine stopping for cutting the coil from the continuous strand and for opening the winding form to eject the coil from the machine. This intermittent movement with stoppage of the winding machine substantially reduced the speed of operation of the machine to produce a coil and also placed a limit on the maximum speed at which coils could be produced, thereby increasing the cost per unit coil.

The present invention contemplates the provision of a new method of winding coils and also a machine incorporating such method of winding, which is continuous in operation to form a series of identical coils at very high speed, so that no stoppage of the machine is necessary until a complete spool of wire is used up. The machine can be operated at varying speeds, that speed being selected which appears most economical, giving consideration to all the production factors. One hundred coils a minute is a speed easily attained with the clear possibility of operating at a still higher speed should such be desirable.

The invention further contemplates the provision of a novel winding form wherein cooperating parts are separated at selected times to allow the winding of a coil having at least two complete turns with the provision of a novel cutoff means to separate the coil from the continuous strand during rotation of the winding form at substantially constant speed, so that it may be ejected from the machine without stoppage thereof.

It is, therefore, a principal object of this invention to provide a high production method of winding electrical coils which operates continuously and is capable of producing more than one hundred coils a minute.

It is a further object of this invention to provide a machine for use in mass production incorporating a method of winding coils continuously at a substantially uniform speed without stoppage of the machine.

It is a further object of this invention to provide a novel coil winding form in a coil winding machine capable of being separated at selected times to wind a coil with at least two turns, which is provided with a coil separating and ejecting means which operate during the continuous winding performance of the machine.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings:

Fig. 1 is a perspective view of a machine from its front side incorporating the novel method of winding coils;

Fig. 2 is a plan view of the machine with the casing covers removed to show the driving details;

Fig. 3 is an elevational view from the right end of Fig. 1, showing the relation of the wire strand and the winding form;

Fig. 4 is an enlarged front elevational view of the winding form showing details;

Fig. 5 is a sectional elevational view taken along line 5—5 of Fig. 4;

Fig. 6 is a sectional view taken on the line VI—VI of Fig. 7;

Fig. 7 is a side elevational view of Fig. 6;

Fig. 8 is an elevational view of the winding form in closed position for winding the large loop of the coil;

Fig. 9 is a view, similar to Fig. 8, with the winding form in open position for winding the small loop of the coil;

Fig. 10 is a view similar to Fig. 8 showing a series of coils in position on the winding form;

Fig. 11 is an end elevational view, partly in section, showing the cutter for separating the completely wound coils;

Fig. 12 is a perspective view of a coil as issued by the machine;

Figs. 13 and 14 are elevational views isolated from the machine showing the coil ejector in two operative positions;

Fig. 15 is an end elevational view of main turn-forming portion of the winding form looking toward the right end thereof as it appears in Figs. 2 and 4; and Fig. 16 is a diagram showing the rotative relations of the operating cams.

Referring to the drawings, particularly to Fig. 1, a machine is disclosed which incorporates in it the new method of winding coils at high speed continuously. A base member 20 is provided, on which is mounted a pair of box-like structures 22 and 24 in parallel spaced relation, between which the winding form F and related parts are positioned. The box-like structures 22 and 24 are conveniently made of plates fastened together with threaded studs in the well-known manner which need not be described in further detail. The smaller right-hand box 22 has mounted on its rear side (Fig. 2) a driving motor 26 which is in belted driving relation with a countershaft 28 journaled in suitable bearings in each of the box-like structures 22 and 24 and passing across the intervening space where the winding form F is located. The countershaft terminates in the box-like structure 24 where its end is journaled in a partition wall 30, which divides the box-like structure into a pair of chambers 32 and 34. In the chamber 32, and also in the box-like structure 22, the countershaft 28 has pinned thereto identical pinions 36 and 38, which mesh with identical gears 40 and 42 suitably mounted in the box-like structures on shafts 44 and 46 which project outwardly into the intervening space in concentric relation, being utilized to drive the cooperating elements of the winding form F as will be further described hereinafter.

It will be noted that the main driving features of the machine, described above, provide a means whereby a pair of suitably journaled shafts 44 and 46 which project toward each other in spaced relation to support the cooperating element of the winding form F may be driven at the same speed by the gear pairs 36, 40 and 38, 42 by the driving motor 26 through the agency of the countershaft 28. The importance of this will appear hereinafter.

Manual starting and stopping switch 48 is mounted conveniently on the front side of the base member 20 to control the operation of the motor 26.

The right-hand shaft 46, rotated by the gear 42 in the box-like structure 22, is provided with the portion 50 of the winding form F which forms the enlarged loop of the coil C (Fig. 12) which, when severed at its apex, forms the leads L of the coil, while the left-hand shaft portion 44, which is of hollow tubular construction, as will appear further hereinafter, is provided with the cooperating portion 52 of the winding form F which forms the main turn of the coil C. The portions 50 and 52 rotate together in a clockwise direction (from right end Fig. 2) to maintain an overhanging cooperative relation throughout the operation of the machine while control elements vary the locus of the winding plane slightly, so that the winding strand S (Fig. 3) will first be wound to form the larger loop to form the coil leads L, and then will be shifted to wind the main turn of the coil C. These control elements are operated in timed relation with the rotation of the portions 50 and 52 through parts positioned on the interior of the tubular shaft 44.

The winding plane for the insulated strand S into the winding form F is determined by sheave 54 (Figs. 1 and 3) which is rotatably positioned over the winding form F by bracket 56 attached to the upper side of box-like structure 24 in any convenient manner. The strand S proceeds from a storage spool 58 through a tensioning device T over sheave 54 and thence into the winding form F, which pulls the strand of the coil being formed forward as it proceeds with the winding of the coil. The winding plane is shifted the thickness of the strand S at the winding form F by a control mechanism operable on the portion 52, which itself, as well as cooperating portion 50, is maintained in the same relative longitudinal position as the winding form rotates to wind the coil.

The winding form portion 52 is a hollow box-like member having six sides, as is best seen in Fig. 5, which determines the shape of the complete turn of the coil, the coil determining the shape and dimension of this member. Hard metal inserts 52A have rounded bosses and are attached by screws at each of the corners to present a smooth surface to the strand S which is wound thereon. The wire is also slightly displaced when wound from the sides of the member 52 which, therefore, only touches this member at the rounded bosses 52A to thereby substantially reduce friction between the wire and the member inasmuch as the completely wound coils must slide along the member longitudinally as more coils are being wound in the winding plane. The left end of the portion 52 is closed by a flat transverse plate 60 (Fig. 4) which is conveniently welded thereto and the plate 60 is removably attached to a face-plate 62 by screws 64, which, in turn, is part of the rotating hollow shaft 44, being preferably integral therewith. In this manner, the portion 52 is attached to the rotatable shaft 44, the dimension and masses being such that the portion is in balanced relation with the center of rotation to reduce excessive vibration during rotation.

Referring back to Fig. 2, it will be noted that the distal end of the hollow shaft 44, which is journaled in suitable bearings in the side member of the box-like structure 24 and its partition 30, is provided with a pinion 66, which meshes with a gear 68 affixed to jack shaft 70 journaled in suitable bearings in the partition 30 and the opposite side member of the box-like structure 24. On the jack shaft 70 are affixed a pair of drum cams 72 and 74 adapted to be rotated in a counterclockwise direction (viewed from right side Fig. 2) by the gear 68 cooperating with the rotating pinion 66. In the perimetrical cam path of the drum cams 72 and 74 followers 76 and 78 are provided which are rotatably attached to arms 80 and 82 pivoted at one end to an anchor block 84 affixed to the back end of the structure 24. The forward ends of the arms 80 and 82 are adapted to be attached to allow relative rotation to a longitudinally reciprocable tube 86 concentric with hollow shaft 44 and to a second longitudinally reciprocable member or rod 88 fitted concentrically within the tube 86 and, in turn, in hollow shaft 44, both of which terminate at their distal ends within the member 52 for purposes to be described hereinafter. The hollow shaft 44, the concentric tube 86, and the rod 88 are all concentric, being adapted to rotate together, but are so devised that tube 86 and rod 88 are capable of longitudinal movement within the shaft 44 which is relatively fixed in the longitudinal direction but rotatable about its journals, together with its cooperating elements just described.

In Figs. 6 and 7, the tube 86 is shown cut off square and a head 90 affixed thereto by screws 92 within the member 52. The head 90 is dimensioned to extend outwardly through apertures 94 in the sides of the member 52 (Fig. 6) which are elongated substantially in a longitudinal direction to allow movement of the head under the thrust of the cam 72 on the roller 76 attached to the arm 80 (Fig. 2) as applied thereby at the end of the tube 86. The head 90 has attached to it a shoe 96 by screws 98, so that the shoe moves with the head 90 to act as a guide for the strand S to displace the strand from its normal operating plane as will be further described hereinafter. The forward perimetrical face 100 of the shoe 96 is given a rounded contour which is highly polished to prevent injury to the insulation on the strand S as it makes contact therewith to displace it from the normal winding plane. The forward face 100 is also cammed uniformly over its face beginning at the apex 100A which is its most forward projecting point and thereafter tapering uniformly in a counter-clockwise direction around the face to a point 100B immediately adjacent the point 100A which is equal to the diameter of the strand S in its displacement. This gives firm contact with the strand throughout the revolution of the face.

The shoe 96 embraces the winding portions of both elements 50 and 52 at selected times as will appear further hereinafter and is provided with a pair of central apertures 102 and 104 for this purpose. The larger aperture 102 provides a sliding fit on the rounded surfaces of the inserts 52A, while the smaller aperture 104 fits closely about a forward ramp-like enlargement 106 on the overhanging portion 108 of the member 50 when the shoe 96 is in its advanced position, as shown in Figs. 8 and 10. The enlargement 106 creates a coil when wound slightly oversize so, as the coil advances from the winding plane, it will loosen slightly to thereby reduce friction and facilitate sliding along the members 52A. Furthermore, it prevents the turn just wound on the enlargement from slipping off the end of the portion 108.

From the description hereinbefore, it is clear that the shoe 96 is moved to each of the extremes of its movement longitudinally of the longitudinally fixed but rotatable members 50 and 52, the retarded position being shown in Fig. 9, while the advanced position is shown in Fig. 10. It will be noted that in Fig. 9, the retardation of the shoe 96 clears the end 106 of the member 50, so that the strand will fall through the gap G and will be wound on the perimeter of the member 52. This forms the main turn of the coil C (Fig. 12) while the leads L are formed when the gap G is closed (Fig. 10) with the strand being wound about the perimeters of both member 52 and member 50, particularly the enlargement 106 thereof being initially displaced by the cam surface 100A and thereafter following the taper around the shoe 100 to the point 100B (Fig. 15) when the shoe is again retarded to wind the main coil portion. The overhang 108 is roughly triangular in shape in cross-section, as is best seen in Fig. 5, with the strand S being wound over its apex which is provided with a renewable hardened insert 110 held in position in any convenient manner as by screws 112. The lower side of the member 108 is hollowed out to provide a clearance K which allows the main turn of the coils C already wound to advance along the inserts 52A of the member 52 to the point where the completed coils are ready to be ejected from the machine by being thrust from the right-hand end of the member 52 (Fig. 10).

In order to eject the completed coils from the machine, the portion of the strand S wound about the portion 108 of the member 50, must be severed which is accomplished by having the member 110 at the apex to fall into the locus of a roller 114 which just contacts the insert 110 when the winding elements are rotating to wind the coil and thereby cuts the strand S which is bent thereover while this coil is in the winding phase, having now been advanced therefrom by the forward thrust of the shoe 96. The turns in the strand S alternate between being wound on the member 50 and the member 52, as is clearly shown in Fig. 10. It is, however, to be understood that coils having several turns in the main body of the coil can also be wound in this machine, if desired, by changing the timed relation between the control cams 72 and 74, without changing the machine in any material aspect and all within the spirit of the invention. The present machine winds a coil with two turns in the coil giving two active coil sides which will be the result when the procedures set forth are followed.

The strand S is severed by the roller 114 after several coils have been wound, so that the strand will not loosen to relax the tension required to issue the strand from the tension device T. Ejection of the coil occurs at the end of the member 52 by a special ejector finger 116 to be further described hereinafter including its actuating mechanism.

Returning now to the cutter roller 114, it severs the already wound coils from the strand S while the winding machine is rotating by hitting the strand S at the apex member 110 substantially a hammer blow to part the strand, which is usually formed of insulated copper wire. The support elements for the roller must, therefore, be sturdily constructed, and consist of an arm 117 pivotally mounting the roller at its lower end by suitable journals, while the arm itself is pivotally mounted on bracket 118 attached to the top of the housing 22, as best seen in Fig. 1. An adjustable stud 120 contacts the arm 117 above the roller 114 (Fig. 11) which is also supported by a bracket 122 attached to the housing 22. This gives a ready adjustment for the cutter roller 114.

When heavier wire sizes are used for the strand S, which may be excessively stiff to bend smoothly over the rounded corners 52A of the winding form, the coil sides may bulge outwardly so as to make the coil unsuitable for use. Generally speaking, the active coil sides which are to be mounted in the slots of an armature should be straight, otherwise, their mounting in the slots will be difficult. In order to make the active coil sides as flat as desired, a pair of ironing shoes 119 and 121 are provided (Fig. 5) which press the coil sides down toward the member 52. The shoes 119 and 121 are preferably pivotally mounted on the member 50 approximately at a midpoint of the coil by means of yokes 123 pivoted at an intermediate point by shaft 124 affixed in brackets 126 attached to the side of the member 50, as best seen in Figs. 4 and 5. The member 50 is provided with a counterweight W to balance it for reducing vibration under rotation.

The distal end of the yokes 123 are provided with rollers 128 which are resiliently urged against a fixed cam member 130 on the housing 22 by springs 132 anchored on ears 134 affixed to the sides of the counterweight W by screws 136 or the like. The spring 132 contacts the yoke 123 beyond its pivot point on shaft 124 to urge the roller inwardly to contact the cam 130 which has two symmetrically disposed flat spots 130A which release the shoes 119 and 121 from pressing or ironing the coil sides flat. As will be best seen in Fig. 4, the shoes contact the coil sides between the winding plane and the plane of the cutter roller 114. The shoes further tend to prevent loosening to an undesirable extent the already wound coils on the form F.

The ejector finger 116 has already been referred to above as a mechanical means whereby the completely-wound, ironed and severed coils are pushed downwardly (Figs. 4, 10, and 14) to remove the completed coil from the winding form F and ejected from the machine by centrifugal force from the rotating form. The finger 116 is the lowermost part of a bar 138 which is provided at its upper end with a headed stud 140 adapted to move in an arcuate guide slot 142 formed in an angle iron 144 fixedly attached to the inner side of the member 52 by screws or the like. The bar 138 is adapted to move in a central plane of the member 52, as is best seen in Fig. 5, and cooperates at its lower end with a slot 146 at the lower apex of the member 52 to contact the lower apex of the coil. Approximately midpoint of the bar 138, a bellcrank 148 is pivotally attached thereto, the bellcrank being pivoted at 150 at the lower side of the member 52. The opposite arm of the bellcrank 148 has pivotally attached to it a link 152, which has its opposite end pivotally attached to a lateral projection 154 of a head 156 fixedly attached to reciprocating rod 88 already described. As the rod 88 is reciprocated in timed relation by its actuating cam 74 (Fig. 2), the finger 116, by the mechanism described, is moved from its normal position shown in Fig. 13 to its ejecting position shown in Fig. 14. To facilitate the removal of the completely-wound coils from the member 52, its upper end is rounded off at 158 as seen in the various figures of the drawings. The block 90 is cut away at 90A (Fig. 15) to provide the necessary clearance for the moving parts of the ejector mechanism mounted inside of the member 52.

Referring now to Fig. 16, the relation between the cams 72, 74 and stationary cam 130 and also the winding form F is shown. The hammers or ironers 119 straighten the coil sides at positions $f$, $g$, $h$, and $i$, while, at the remaining points, the ironers are retracted, particularly at the beginning of the winding cycle, where the shoe 96 thrusts the already-wound coils along the members 108, 50 and 52, as is best seen in Fig. 10, so that the loop L may be severed at its apex to form the leads for the completed coil C as shown in Fig. 12. This thrust of the shoe 96 occurs in the 40 degrees of rotation of the jackshaft 70 as shown on the upper scale as compared with the rotation of the main shaft. It will be noted that the main shaft 46 makes two revolutions for one of the jackshaft 70, in other words, the winding form F is rotated 720°, while the jackshaft 70 makes one revolution or 360°.

Distance $d$ is the angle through which the shoe 96 advances to its most forward position, after which it immediately retreats to make room for the first turn of the coil which is wound around the overhang 108 which, when severed several revolutions later by roller 114, provides the trailing terminal end of one coil and the leading terminal end of the next coil to the be wound. Then after 360° of revolution of the winding form, the shoe 96 retreats to its rearmost position to form the gap G (Figs. 2, 4, and 9) which allows the winding of the complete turn about the portion 52 of the winding form. After 720° of rotation, a new cycle begins.

The ejection of completed coils from the winding form F by finger 116 occurs at $e$ in the first 90° of rotation of the winding form, at a position adjacent the terminal end of the member 52 in which the finger 116 is mounted as has already been described. This ejecting point is substantially beyond the locus of the shoes or ironers 119 and also beyond the locus of the cutting roller 114, which is made clear by again referring to Fig. 10, which shows two completed coils still on the member 52 with the leads L in severed form while a third coil is just being ejected. The ejector finger 116 is actuated only once in 720° of rotation of the winding form F. The roller 114 makes contact at 0°, 360°, and 720° of rotation of the winding form.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art except as required by their terms.

What is claimed:

1. In a device of the class described, a winding form having two cooperating members adapted to rotate together to provide a smaller and a larger perimeter to form a coil body on the smaller perimeter and a loop on the larger perimeter to provide opposite coil ends on adjacent coils, a guide means rotating with the members to control a strand adapted to be wound on both the smaller and larger perimeter repetitively and alternately, means to rotate the form members and the guide means continuously to wind the strand on the form members, said guide means being positioned in spaced relation in one phase of the winding cycle to form a gap with the member defining the larger perimeter, the strand passing through the gap to wind on the smaller perimeter defining thereby a normal winding plane, said guide means being movable to a second position to close the gap and move the just-wound turn on the smaller perimeter axially along the portion of the form defining the smaller perimeter and also to guide the strand out of the normal winding plane to an adjacent plane to wind the strand on the larger perimeter, and means to move the elements of the device in timed relation continuously with the rotation of the form members to alternately wind the strand on both perimeters repetitively.

2. In a device of the class described, a winding form having two cooperating members adapted to rotate together to provide a smaller and larger perimeter to form a coil body on the smaller perimeter and a loop on the larger perimeter to provide opposite coil ends on adjacent coils, a guide means rotating with the members to control a strand adapted to be wound on both the smaller and larger perimeter repetitively and alternately, means to rotate the form members and the guide means continuously to wind the strand on the form members, said guide means being positioned in spaced relation in one phase of the winding cycle to form a gap with the member defining the larger perimeter, the strand passing through the gap to wind on the smaller perimeter defining thereby a normal winding plane, said guide means being axially movable to a second position to close the gap and move the just-wound turn on the smaller perimeter axially along the portion of the form defining the smaller perimeter and also to guide the strand out of the normal winding plane to an adjacent plane to wind the strand on the larger perimeter, means to sever the loop formed on the larger perimeter to free the coil, and means to move the elements of the device in timed relation continuously with rotation of the form members to alternately repetitively wind the strand on both perimeters repetitively.

3. In a device of the class described, an open-ended winding form having two cooperating members adapted to rotate together to provide a smaller and a larger perimeter to form a coil body on the smaller perimeter and a loop on the larger perimeter to provide opposite coil ends on adjacent coils, a guide means rotating with the members to control a strand adapted to be wound on both the smaller and larger perimeter repetitively and alternately, means to rotate the form members and the guide means continuously to wind the strand on the form members, said guide means being positioned in spaced relation in one phase of the winding cycle to form a gap with the member defining the larger perimeter, the strand passing through the gap to wind on the smaller perimeter defining thereby a normal winding plane, said guide means being axially movable to a second position to close the gap and move the just-wound turn axially along the form and also to guide the strand out of the normal winding plane to an adjacent plane to wind the strand on the larger perimeter, means to sever the loop formed on the larger perimeter to free the first-wound coil of a series, means to eject the severed coil from the open end of the form, and means to move the elements of the device in timed relation continuously with rotation of the form members.

4. The method of continuously winding a strand into coils on a rotating open-ended form including at least two rotating portions, comprising winding the strand alternately and repetitively on larger and smaller perimeters by rotating the portions of the form together, controlling the strand by a third member rotating with the form portions to guide the strand repetitively to the two perimeters alternately and also to advance the already-wound coils axially along to the open end of the smaller form member, and cutting the strand on the larger perimeter preparatory to ejecting the severed coil from the form.

5. The method of continuously winding a strand into coils on an open-ended rotating form having portions forming larger and smaller perimeters, comprising guiding the strand alternately and repetitively to the larger and smaller perimeters to form larger and smaller turns of the coil, simultaneously shifting the already-wound coil axially along the form portions, and cutting the larger turn of the coil preparatory to ejecting the severed coil from the form.

6. The method of continuously winding a strand into coils on a rotating open-ended form including at least two rotating portions, comprising winding the strand alternately and repetitively on larger and smaller perimeters by rotating the portions of the form together, controlling the strand by a third member rotating with the form portions to guide the strand repetitively to the two perimeters alternately and also simultaneously advancing the already-wound coils along the form members by said third member toward the open end, and cutting the strand in the larger perimeter preparatory to ejecting the severed coil from the open end of the form.

7. The method of continuously winding a strand into coils on an open-ended rotating form having cooperating portions forming larger and smaller concentrically rotating perimeters, comprising guiding the strand alternately and repetitively to the larger and smaller perimeters to form larger and smaller turns of the coil, simultaneously shifting the already-wound coils axially along to the open end of the form, and cutting the larger turn of the coil to form coil leads for adjacent coils preparatory to ejecting the severed coil from the form.

References Cited in the file of this patent

UNITED STATES PATENTS

| | | |
|---|---|---|
| 1,472,543 | Beere | Oct. 30, 1923 |
| 2,049,587 | Lehman | Aug. 4, 1936 |
| 2,085,957 | Collins | July 6, 1937 |

FOREIGN PATENTS

| | | |
|---|---|---|
| 136,785 | Germany | Dec. 24, 1902 |
| 289,770 | Great Britain | Apr. 25, 1929 |
| 399,573 | Great Britain | Oct. 12, 1933 |
| 601,235 | Germany | Aug. 11, 1934 |